United States Patent
Lin

(10) Patent No.: US 6,862,861 B1
(45) Date of Patent: Mar. 8, 2005

(54) UTILITY BRACKET

(75) Inventor: Wei-Chung Lin, Birmingham, AL (US)

(73) Assignee: Bethea Power Products, Pelham, AL (US)

( * ) Notice: Subject to any disclaimer, the term of this patent is extended or adjusted under 35 U.S.C. 154(b) by 37 days.

(21) Appl. No.: 10/261,473

(22) Filed: Sep. 30, 2002

(51) Int. Cl.$^7$ ................................................ B04C 3/30
(52) U.S. Cl. ........................... 52/736.2; 52/40; 52/697; 248/218.4; 248/219.1; 248/219.3; 248/227.3; 403/346
(58) Field of Search ........................ 52/697, 40, 721.2, 52/721.3, 721.4, 721.5, 736.2, 726.4; 174/45 R, 158 R; 403/396, 346, 400, 391; 248/218.4, 219.1, 219.3, 227.3; 256/47, 65.01, 65.03

(56) References Cited

U.S. PATENT DOCUMENTS

| | | | |
|---|---|---|---|
| 868,591 A | * 10/1907 | Yaxley ........................ 52/697 |
| 1,761,509 A | 6/1930 | Williams |
| 1,796,353 A | 3/1931 | Williams |
| 1,825,912 A | * 10/1931 | Markham ................... 248/357 |
| RE18,613 E | 10/1932 | Williams |
| 2,182,660 A | * 12/1939 | Dillard ........................ 248/201 |
| 2,835,002 A | * 5/1958 | Majewski ................... 403/398 |
| 3,428,283 A | * 2/1969 | Dake .......................... 248/214 |
| 3,487,158 A | 12/1969 | Killian |
| 3,538,237 A | * 11/1970 | Hockaway ................... 174/43 |
| 3,555,747 A | 1/1971 | Taylor |
| 3,594,494 A | * 7/1971 | Sullivan ...................... 174/38 |
| 3,625,463 A | 12/1971 | Scholz |
| 3,643,009 A | 2/1972 | Collster |
| 3,715,460 A | 2/1973 | Elliott |
| 3,884,442 A | * 5/1975 | Breeden et al. .............. 211/107 |
| 4,025,824 A | * 5/1977 | Cheatham ................... 361/601 |
| 4,338,040 A | * 7/1982 | Hawkins ..................... 403/385 |
| 4,407,601 A | * 10/1983 | Reeder ........................ 403/25 |
| 4,728,749 A | 3/1988 | Knight |
| 4,932,623 A | * 6/1990 | Reisdorff .................. 248/219.3 |
| 5,228,260 A | * 7/1993 | Dziedzic ...................... 52/697 |
| 5,605,017 A | * 2/1997 | Fingerson et al. ............. 52/40 |
| 5,702,081 A | * 12/1997 | Gallemore, II ........... 248/218.4 |
| 5,799,918 A | * 9/1998 | Swinderman et al. ....... 248/300 |
| 6,626,406 B1 | * 9/2003 | Olson, Jr. ................ 248/219.3 |

* cited by examiner

Primary Examiner—Jeanette Chapman
(74) Attorney, Agent, or Firm—Smith, Gambrell & Russell, LLP

(57) ABSTRACT

An improved crossarm support bracket for preventing excessive bending and breakage at the midsection of crossarms caused by conventional horizontal brackets and supporting heavier crossarms. The improvement comprises a base portion for attaching the bracket to a utility pole, a pair of spaced apart flanges for supporting a crossarm, and a pair of arcuate mounting seats providing contact surfaces with outer edges of the crossarm to minimize deformation of the crossarm.

By assuming a bowed position along the curvature of the seats, the arcuate shaped seats eliminate point pressure exerted by outer ends of conventional horizontal brackets which act as wedges against a crossarm receiving the combined weight of the distal ends of the crossarm. Mounting seats further minimize deformation of the crossarm by contacting the crossarm at its outer edge rather than the entire surface area.

9 Claims, 5 Drawing Sheets

UTILITY BRACKET

FIELD OF THE INVENTION

The present invention relates generally to mounting hardware for the utility industry. More particularly, it relates to an improved crossarm support bracket which prevents excessive bending and stress fractures of utility crossarms caused by conventional brackets.

BACKGROUND OF THE INVENTION

Light weight crossarms such as those made of reinforced fiberglass have become a preferred solution for utility companies. Although lightweight crossarms were implemented in response to concerns regarding the extremely heavy weight of timber crossarms, their reduced weight and increased flexibility create new problems. Over extended periods of time, the combined weight of the crossarm's distal ends, insulators, and long spans of heavy cable load, can become too heavy for light weight crossarms. In particular, a light weight crossarm which is supported substantially at its midsection has a tendency to bow as a result of the combined weight. The prior art brackets are not designed to conform to this curvature and as a result stress fractures develop which substantially weaken the crossarm. Accordingly, the aforementioned excessive pressure exerted at the midpoint of a crossarm results in a shortened lifespan for the crossarm.

Prior art brackets such as U.S. Pat. No. 3,555,747 to Taylor are "lightweight and capable of carrying the vertical loads imposed by long spans of heavy conductor cables and the concurrent ability to withstand longitudinal 'dead-end loads' produced by the full tension load in a terminating conductor and to transmit such longitudinal loads directly to a down guy connecting the 'dead-end' utility pole to a ground anchor." However, such devices do not compensate for the excessive bending of the crossarm support toward the load which occurs over time. Thus, there is a significant need for a strong lightweight bracket which provides a solution to the aforementioned problems and thereby prevents the excessive bending and stress fractures caused by conventional crossarm support brackets without creating surface anomalies on the crossarms.

SUMMARY OF THE INVENTION

One objective of the present invention is to provide a light weight bracket which is strong enough to support the weight of a crossarm at a dead-end.

Another objective of the present invention is to provide a light weight bracket which securely attaches a crossarm to a utility pole.

Yet another object of the present invention is to provide a means for distributing the weight of a crossarm more evenly.

It is also an object of the present invention to provide a means for reducing the point pressure exerted by the endpoints of conventional rigid horizontal crossarm support brackets thereby increasing the lifespan of a crossarm.

Still another object of the present invention is to provide an arcuate support for a crossarm at the midpoint of the crossarm thereby allowing the crossarm to assume a natural bending position along the curvature of the support.

Another object of the present invention is to provide a crossarm support which conforms to the natural curvature of a horizontally disposed crossarm to prevent stress fractures therein and thereby extend the life of the crossarm.

Yet another object of the present invention is to provide a means for attaching and supporting the crossarm with minimal deformation of the crossarm.

These and other objects of the invention are accomplished through the use of an improved crossarm support bracket comprising a utility pole engaging portion and support for a crossarm which eliminates the excessive point pressure exerted by conventional horizontal brackets. The support for a crossarm comprises a pair of arms extending outwardly from the engaging portion, a pair of flanges extending perpendicularly from the top and bottom of the arms to form a channel, and integral raised mounting seats between the two flanges. Arcuate shaped arms conforming to the curvature of the midsection of a loaded crossarm prevent formation of stress fractures in the crossarm. The channel extends laterally to a distance which maximizes the supported weight of the crossarm. The flanges have formed therein a plurality of holes for securing the crossarm to the bracket. The arcuate shaped channel supports the midsection of the fiberglass crossarm as it assumes a natural bending position along the curvature of the channel thereby eliminating the excessive point pressure and resulting stress fractures associated with prior art brackets. The raised mounting seats provide maximum support for the fiberglass crossarm while minimizing deformation of the fiberglass crossarm.

Other features, objectives and advantages of the present invention will become apparent from a reading of the following description as well as a study of the appended drawings.

BRIEF DESCRIPTION OF THE DRAWINGS

A crossarm support bracket incorporating the features of the present invention is depicted in the attached drawings which form a portion of the disclosure and wherein.

DESCRIPTION OF THE PREFERRED EMBODIMENTS

Figure 1:
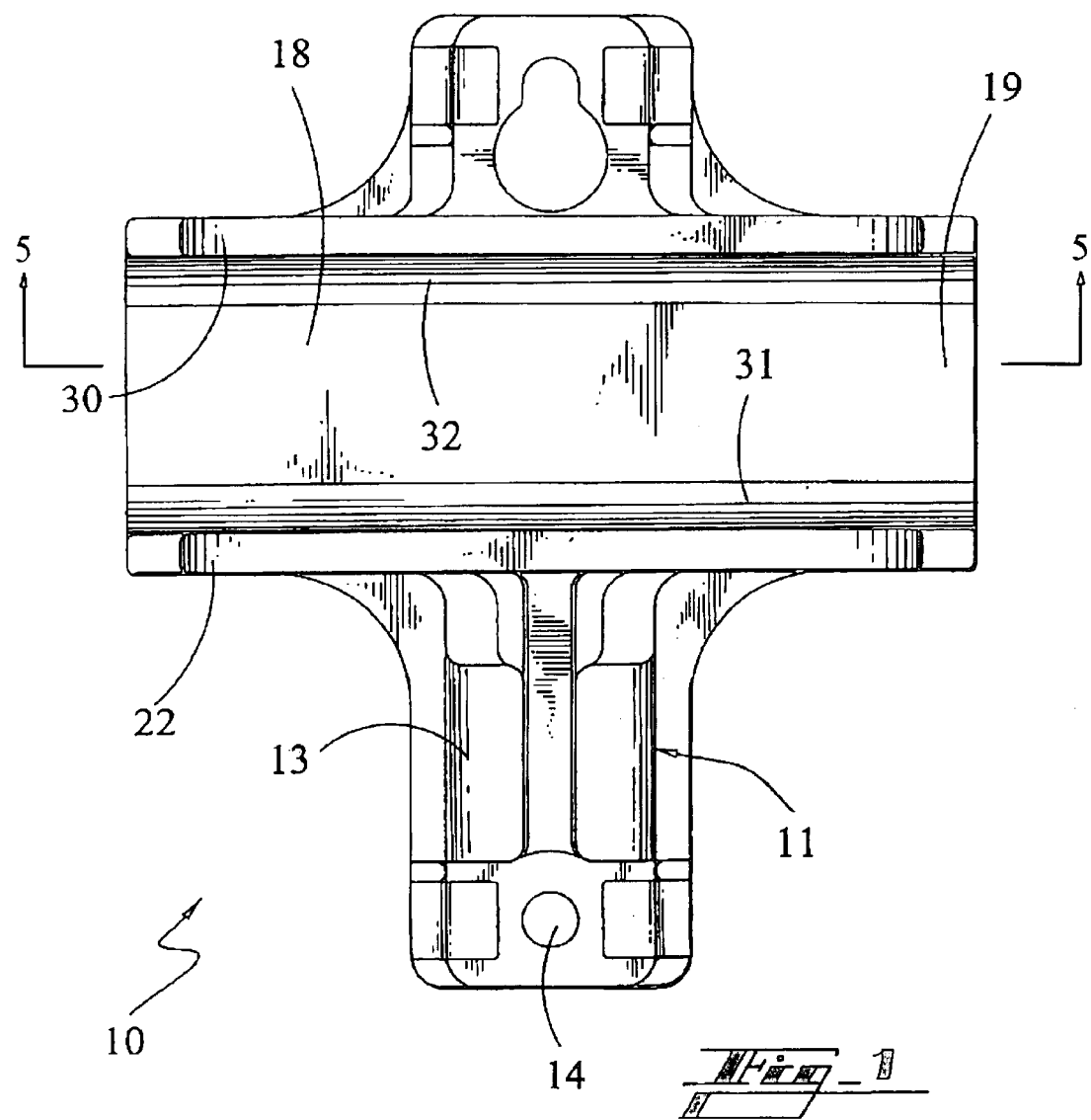
FIG. 1 is a front elevation view of the present invention showing the pair of arms.

Referring to the drawings for a better understanding of the function and structure of the invention, a preferred embodiment of the crossarm bracket of the present invention is illustrated. The crossarm support bracket of the present invention is indicated generally by the number 10 as shown in FIGS. 1–5. Preferably made as an aluminum casting, the present invention will be available in a number of sizes to accommodate varying sizes of crossarms.

Figure 2:
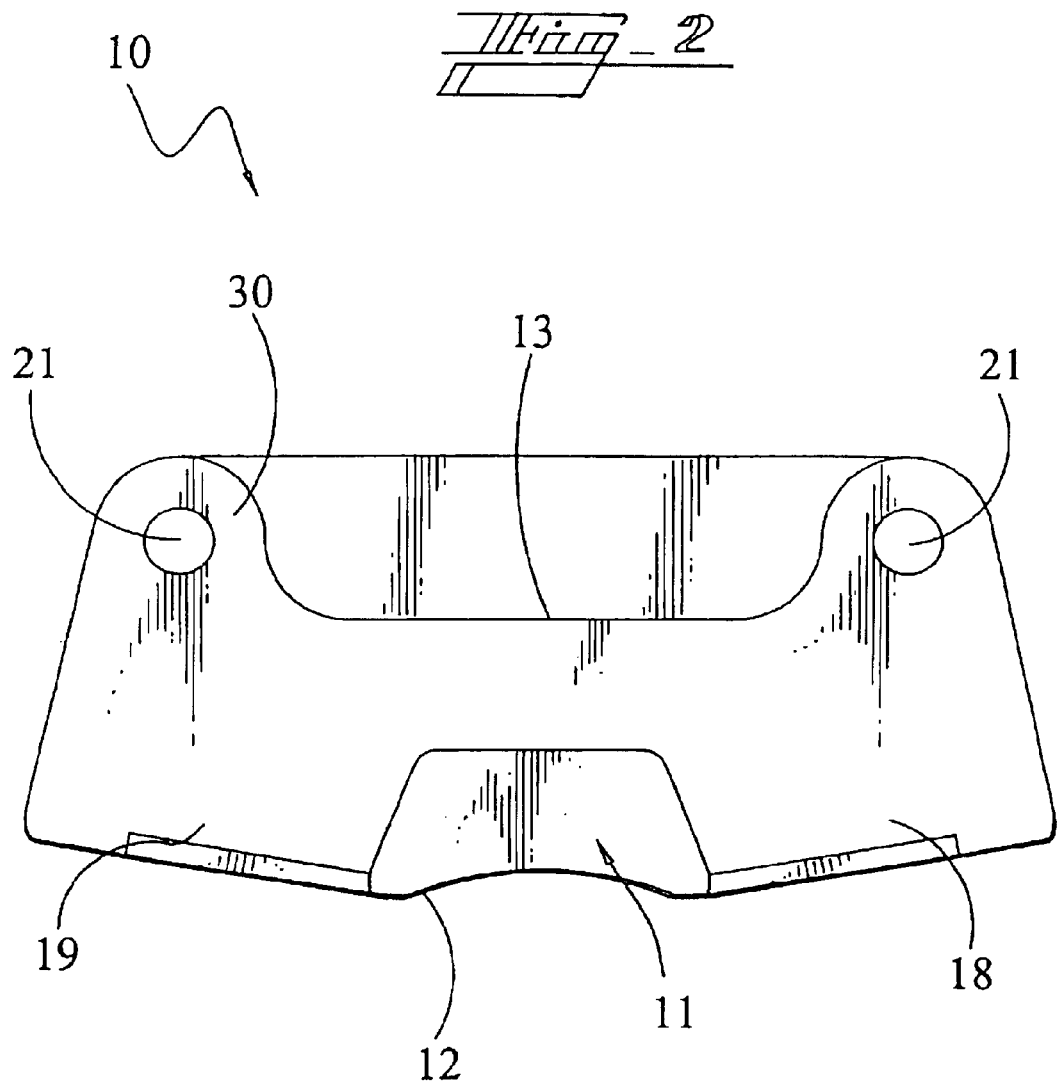
FIG. 2 is a top plan view of the present invention.
Figure 3:
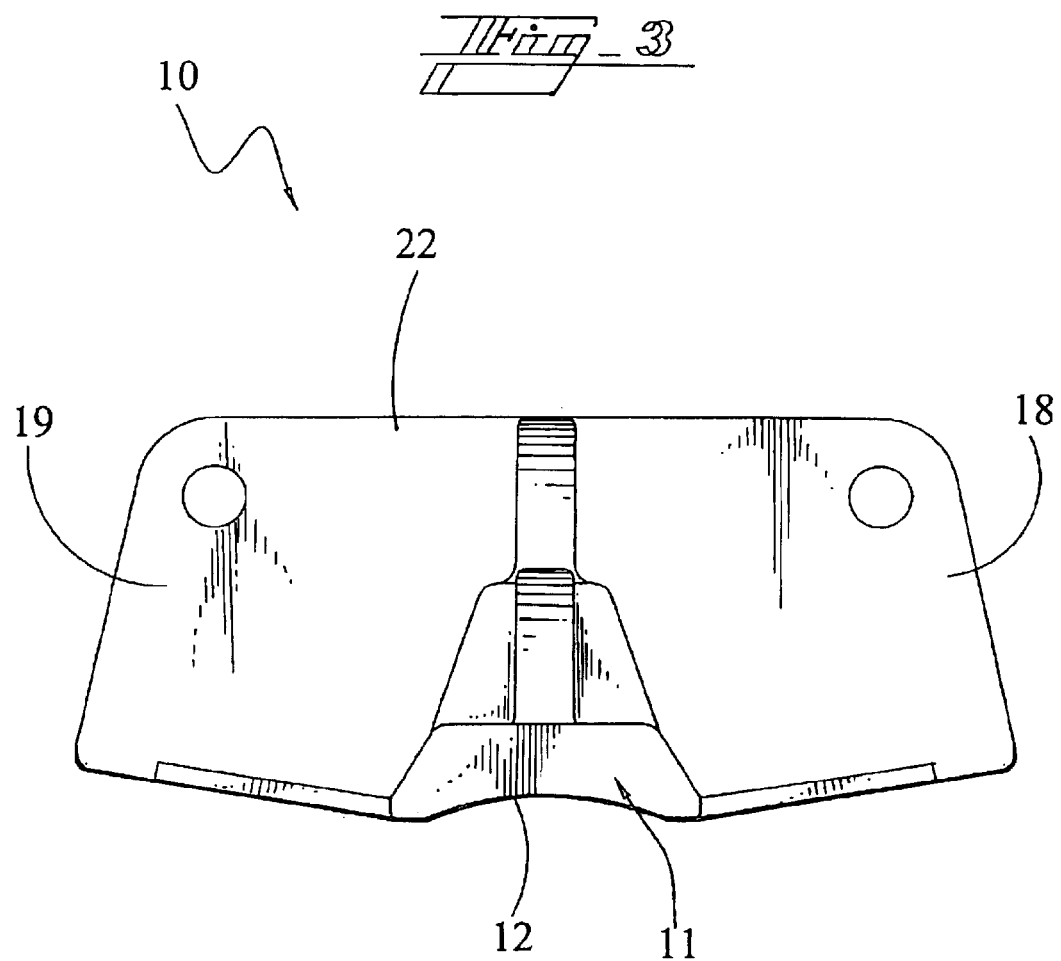
FIG. 3 is a bottom plan view of the present invention.

Looking to FIGS. 1 and 2, the crossarm support bracket 10 comprises a vertically elongated base portion 11. The base portion 11 has a utility pole engaging side 12 and an opposing side 13. The base portion 11 has formed therein a plurality of mounting apertures 14 along the vertical axis of the base portion 11 through which suitable fasteners are inserted for securing the support bracket 10 to a utility pole (not illustrated) and for securing guy wires as is well known.

As shown in FIG. 2, the base portion 11 has integrally formed thereon a pair of horizontally extending arms 18 and 19. Coextending perpendicularly along the bottom and top of the arms 18 and 19 and forming an outwardly opening channel therewith are flanges 22 and 30 for supporting a crossarm. Both arms 18 and 19 have an arcuate shape conforming to the natural bow of a crossarm supporting a load as at a dead end. The flanges 22 and 30 have formed therein a plurality of holes 21 through which fasteners (not illustrated) are inserted for securing a crossarm to the support bracket 10. The arcuate shapes of the arms 18 and 19 provide support for the crossarm over the entire surface of the channel rather than concentrating support at the rigid distal ends as in prior art brackets. In other words, the curvature shape of the channel allows the midsection of the crossarm to be supported in a natural deflection along the curvature of the arms 18 and 19. This significantly reduces the line pressure exerted by the distal ends of conventional rigid horizontal brackets which only engage the stressed crossarm at the ends.

Figure 4:
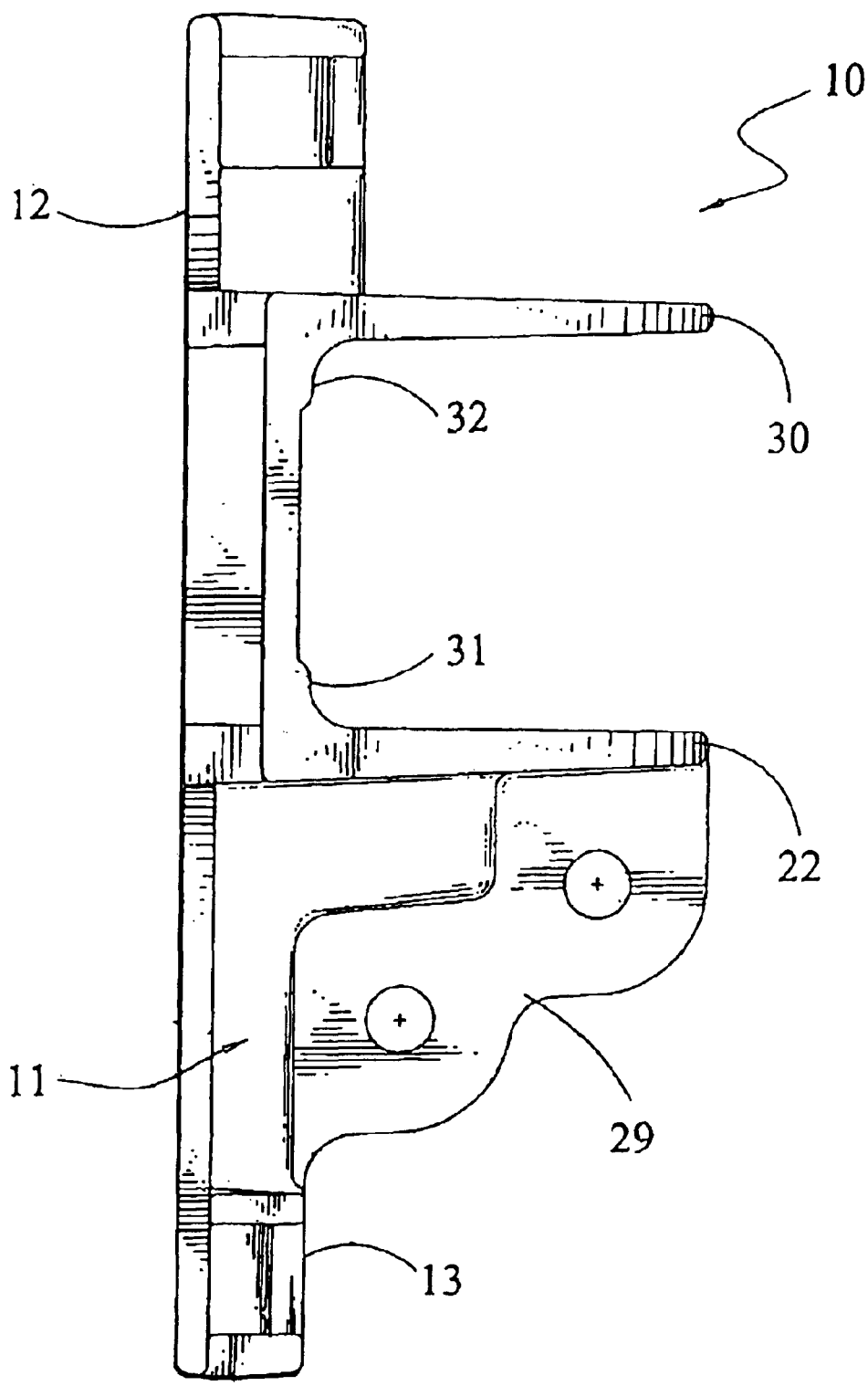
FIG. 4 is a side elevational view of the present invention showing the flanges for supporting a crossarm.

As shown in FIG. 4, a supporting rib 29 fixedly attaches base portion 11 to lower flange 22. As with conventional brackets, the supporting rib 29 provides additional support for lower flange 22. Supporting rib 29 is also used as a guying eye for securing the guy wires to the pole from the ground.

Figure 5:
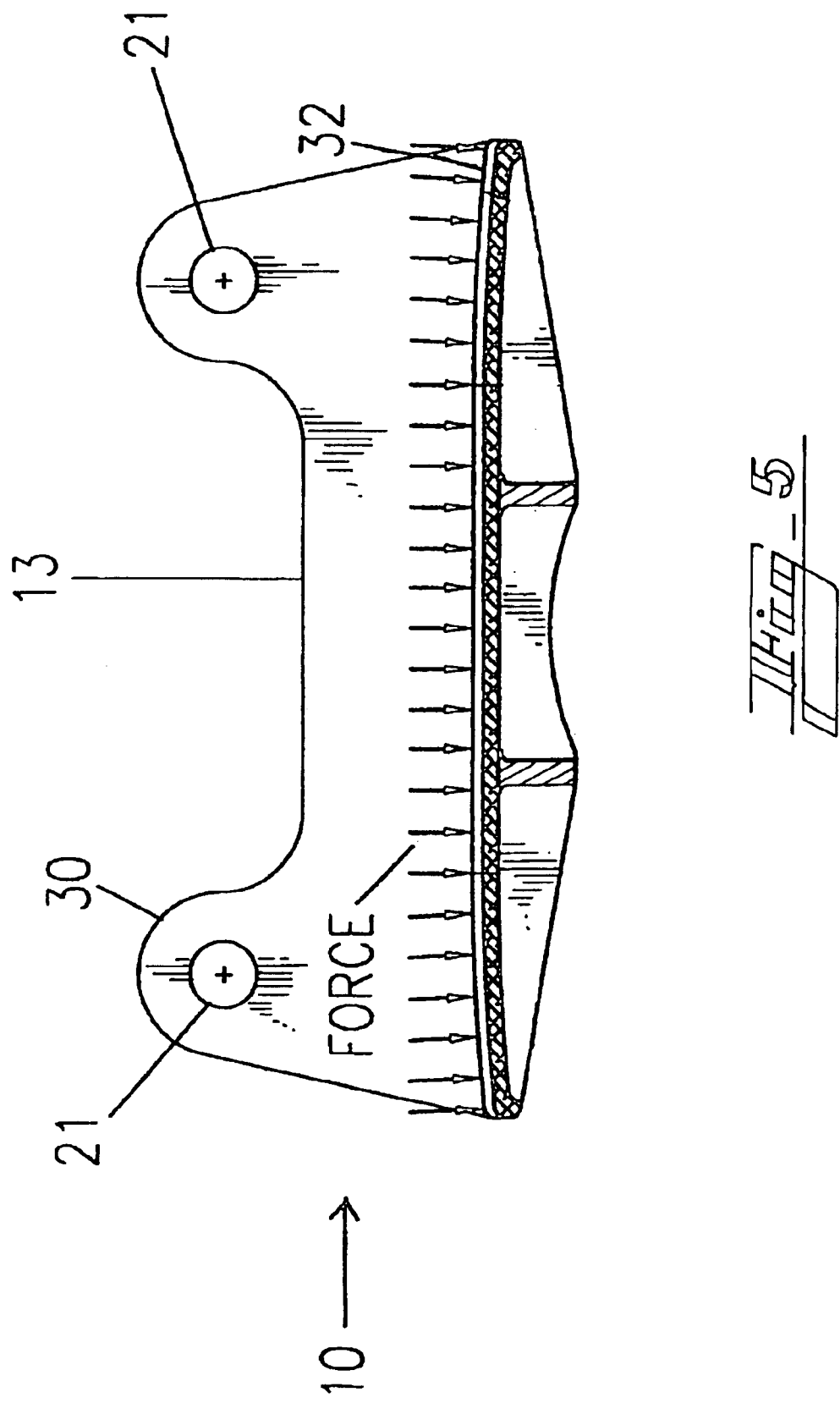
FIG. 5 is a sectional view of the channel showing the support rib having a flat mid-span and a curvature radius on both ends.

Referring now to FIGS. 4 and 5, an integrally formed lower mounting seat 31 and upper mounting seat 32 are formed where the base portion 11 attaches to the lower flange 22 and the upper flange 30. Both lower mounting seat 31 and upper mounting seat 32 have a flat span in the middle and defined curvatures at both ends, such that the crossarm is supported relative to cable loading forces exerted in a transverse generally horizontal direction at the outer edges (as illustrated in FIG. 5), minimizing deformation of the crossarm as a result of such loading forces. That is to say, the fiberglass crossarm is a square tube, thus the greatest strength of the tube lies along its corners where the adjacent walls provide orthogonal reinforcement, as opposed to the un-reinforced center of the tube wall. Therefore, supporting the crossarm against cable-loading forces at the edges will lessen the likelihood of creasing the crossarm tube in between the corners, which further tends to weaken the crossarm.

There has been disclosed, heretofore, the best embodiment of the present invention for a UTILITY BRACKET. Alternative embodiments will become apparent to those skilled in the art to which the present invention pertains without departing from its spirit and scope. Accordingly, the scope of the present invention is defined by the appended claims rather than the foregoing description.

What is claimed is:

1. A support bracket for supporting a crossarm of an electrical distribution pole, comprising:
    (a) a vertically elongated base portion, said base portion having a pole engaging side and an opposing side;
    (b) a pair of horizontally extending arms having a top surface and a bottom surface, wherein said arms are integrally formed thereon on opposite sides of said base portion;
    (c) an upper flange and a lower flange for supporting the crossarm, said upper flange integrally coextending along said top surface of said arms and said lower flange coextending along said bottom surface of said arms, said flanges in a perpendicular position with respect to said arms; and
    (d) an upper mounting seat and a lower mounting seat said upper mounting seat integrally coextending along the bottom of said upper flange and said lower mounting seat integrally coextending along the top of said lower flange, both mounting seats providing contact surfaces for said crossarm.

2. The support bracket of claim 1, wherein said base portion has a plurality of holes formed therein through which suitable fasteners are inserted for securing said support bracket to utility the electrical distribution pole.

3. The support bracket of claim 1, wherein said arms have an arcuate shape conforming to the natural bow of the crossarm under tension at its ends thereby eliminating excessive point pressure.

4. The support bracket of claim 1, wherein said flanges have formed therein a plurality of holes for receiving bolts securing the crossarm to said support bracket.

5. An apparatus for supporting a crossarm on a utility pole, comprising:
    (a) a first portion for attaching said apparatus to the utility pole; and
    (b) a second portion for supporting the crossarm, said second portion being substantially perpendicular to said first portion, wherein said second portion comprises a pair of spaced apart flanges for receiving a midsection of the crossarm therein and a pair of mounting seats for contacting said crossarm, each said mounting seats substantially extending the length of one of said spaced apart flanges,
    said second portion having an arcuate shape conforming to the curvature of the midsection of a crossarm to prevent formation of stress fractures in the crossarm and said mounting seats contacting the outer edges of said crossarm for increased support and minimal deformation of said crossarm.

6. A support bracket for supporting a crossarm, said support bracket comprising:
    a channel for supporting the crossarm, said channel defined by an upper flange and a lower flange, said upper flange connected to said lower flange by a rear arm surface;
    said rear arm surface of said channel having formed therein a curved shape extending the length of said rear arm surface and providing continuous support along a natural flexure radius of said crossarm along the curvature of said channel;
    an upper mounting seat substantially extending the length of said channel, said upper mounting seat integrally coextending along said upper flange, and
    a lower mounting seat substantially extending the length of said channel, said lower mounting seat integrally coextending along said lower flange, wherein said upper mounting seat and said lower mounting seat provide load surfaces for the crossarms.

7. The support bracket of claim 6, wherein said upper flange and said lower flange have formed therein a plurality of holes for receiving suitable fasteners securing the crossarm to said support bracket.

8. The support bracket of claim 6 further comprising means for attaching said bracket to a utility pole.

9. The support bracket of claim 7, wherein said means for attaching said support bracket to a utility pole has formed therein a plurality of holes for receiving suitable fasteners.

* * * * *